No. 655,839. Patented Aug. 14, 1900.
J. B. THACHER.
CAR STEP.
(Application filed Oct. 20, 1899.)

(No Model.)

Witnesses:
Dexter Reynolds
James M. Brown

Inventor:
John B. Thacher.
By W. W. Brown
his Atty.

UNITED STATES PATENT OFFICE.

JOHN BOYD THACHER, OF ALBANY, NEW YORK.

CAR-STEP.

SPECIFICATION forming part of Letters Patent No. 655,839, dated August 14, 1900.

Application filed October 20, 1899. Serial No. 734,277. (No model.)

*To all whom it may concern:*

Be it known that I, JOHN BOYD THACHER, a citizen of the United States, residing at Albany, New York, have invented certain new and useful Improvements in Car-Steps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a new and improved step for street-cars and other like vehicles.

Figure 1:
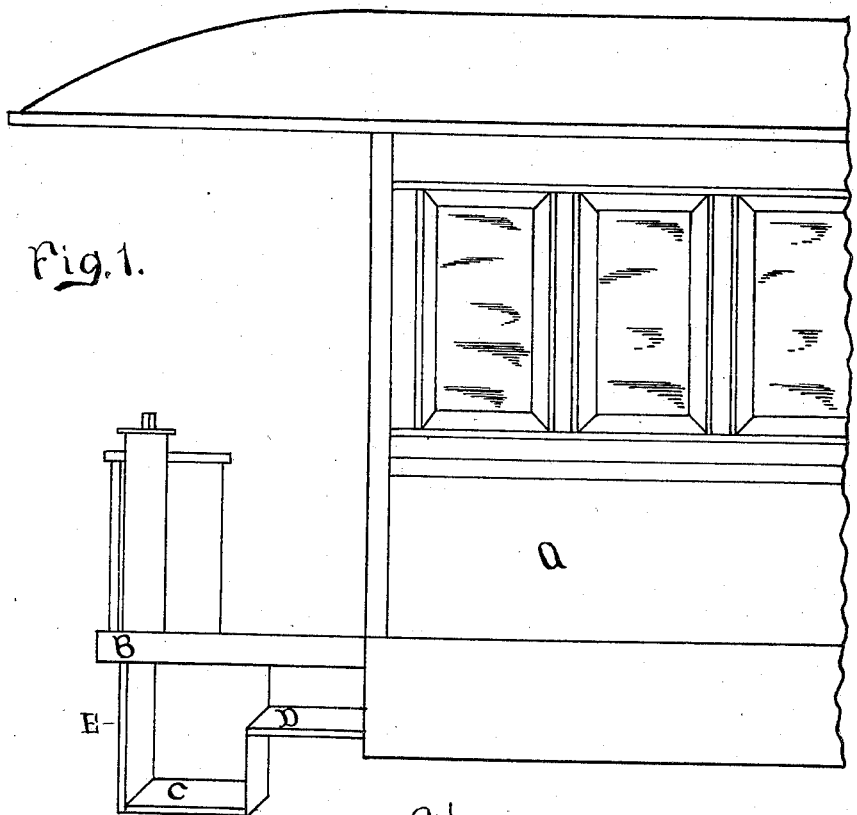
Figure 2:
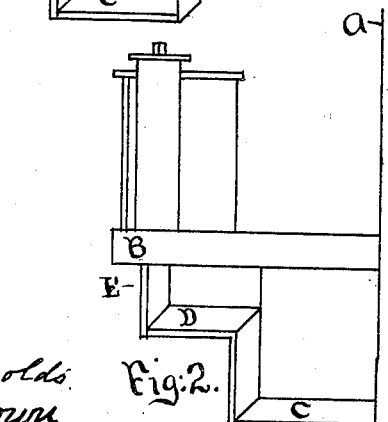

In the drawings, Figure 1 shows a side elevation of a portion of a street-car and one of its platforms with a similar view of my improved step in operative position, and Fig. 2 a similar view of my steps turned or set with the second step oppositely located from the same step shown in Fig. 1.

In such vehicles having a motor underneath the car the bulk of the motor and connecting machinery is so great that the car body and platform are necessarily raised to a considerable height above the pavement, necessitating one or more steps to enable patrons to enter and leave the car, and where but one step is provided, as is now the universal custom, the step is so high either from the pavement to the step or from the step to the platform that many persons have great difficulty in mounting it on account of its height. I remedy this difficulty by the arrangement of steps shown.

The letter A shows the car, and B the platform.

C shows one of my steps, which is set in a horizontal line with the step D, but dropped down on a lower plane in order that it shall not project outward into the street or beyond the horizontal line of the car-body farther than step D, and thus it is not liable to be run against by teams or form an obstruction to the free passage of vehicles or persons, as would be the case if it was arranged as two such steps are ordinarily—that is, one in front of the other, but on a lower plane.

As I have shown, the first or lower step may be next to the car or it may be nearer the end of the platform, as shown in Fig. 1, which is my preferred manner of setting it, as a person when leaving the car will step from the platform B to step D, then to step C, and from that step to the pavement, which is a perfectly-natural manner of procedure.

At E will be seen an upright piece connecting the step C, Fig. 1, with platform B, and this upright piece serves not only to form a connection and support for the step, but more especially provides a means for preventing said step being approached and mounted from a direction lengthwise the tread and compels the steps to be approached and mounted from a direction transverse the lengthwise axis of the car and platform. In mounting the steps shown in Fig. 1 the passenger will step upon step C with his left foot, then step upon step D with his right foot, and then upon platform B with his left foot, approaching the steps always from a direction transverse the lengthwise axis of the car, as upright E prevents their approach and use from any other direction. By this arrangement of steps I provide a means whereby persons in delicate health or otherwise rendered unable to use high steps may easily and comfortably enter and leave such cars.

Having described my invention, what I claim is—

1. Steps for street-cars and other vehicles arranged in connection with the end platforms thereof, the treads of the steps being set so their lengthwise axis will be parallel with the lengthwise axis of the car and having means preventing said steps being mounted from a direction lengthwise the treads and arranged so that said steps will be usable only when approached from a direction transverse to the length of said car, the steps or treads being arranged so that the upper one occupies but a portion of the distance between the end support of the series of steps and the end of the car and the lower one the supplementary distance substantially as described.

2. A plurality of steps leading to the end platforms of a car or other vehicle, and having means to prevent said steps being mounted from a direction lengthwise the treads, the front edges of the treads being approachable and usable only from a direction transverse to the length of said car and arranged in planes whose lengthwise axis is parallel with the lengthwise axis of the car, the steps or treads being also arranged so that the upper one occupies but a portion of the distance between the end support of the series of steps and the end of the car and the lower one the supplementary distance substantially as described.

In testimony whereof I affix my signature in presence of two witnesses.

JOHN BOYD THACHER.

Witnesses:
A. M. TURNER,
JAMES M. BROWN.